United States Patent
Sharma et al.

(10) Patent No.: US 10,387,640 B2
(45) Date of Patent: Aug. 20, 2019

(54) CLOUD BASED VIRTUAL COMPUTING SYSTEM WITH LICENSE SERVER

(71) Applicant: Emonix, Inc., Madison, WI (US)

(72) Inventors: Alok Sharma, Sarasota, FL (US); Suman Banerjee, Madison, WI (US)

(73) Assignee: MOBILENERD, INC., Sarasota, FL (US)

( * ) Notice: Subject to any disclaimer, the term of this patent is extended or adjusted under 35 U.S.C. 154(b) by 13 days.

(21) Appl. No.: 15/584,770

(22) Filed: May 2, 2017

(65) Prior Publication Data
US 2018/0322272 A1 Nov. 8, 2018

(51) Int. Cl.
| | |
|---|---|
| *H04W 4/00* | (2018.01) |
| *G06F 21/44* | (2013.01) |
| *H04L 29/06* | (2006.01) |
| *H04L 29/08* | (2006.01) |
| *G06F 16/182* | (2019.01) |

(52) U.S. Cl.
CPC .......... *G06F 21/44* (2013.01); *G06F 16/1824* (2019.01); *H04L 29/08135* (2013.01); *H04L 63/08* (2013.01); *H04L 63/10* (2013.01); *H04L 67/14* (2013.01); *H04W 4/00* (2013.01)

(58) Field of Classification Search
CPC ......... H04L 67/14; H04L 63/08; H04L 63/10; H04L 29/08135; G06F 21/44; G06F 17/30197
See application file for complete search history.

(56) References Cited

U.S. PATENT DOCUMENTS

| | | | |
|---|---|---|---|
| 2003/0191799 A1 | 10/2003 | Araujo et al. | |
| 2012/0311106 A1* | 12/2012 | Morgan | H04L 41/0806 709/220 |
| 2015/0356279 A1* | 12/2015 | Montana | G06F 21/105 726/28 |
| 2016/0099948 A1 | 4/2016 | Ott et al. | |
| 2016/0364201 A1 | 12/2016 | Beveridge et al. | |

OTHER PUBLICATIONS

Office Action dated Feb. 11, 2019 from related U.S. Appl. No. 15/584,776.
Office Action dated Jan. 7, 2019 from related U.S. Appl. No. 15/584,762.

* cited by examiner

*Primary Examiner* — El Hadji M Sall

(57) ABSTRACT

A method includes establishing a virtual network connection between a local network including a plurality of virtual machines executing on at least one application server and a license server. The license server is executed by a first computing device different than the application server. A first license authorization request is received from a first virtual machine of the plurality of virtual machines at the license server over the virtual network connection. A number of active sessions of the first application executing on the plurality of virtual machines is determined. A license approval or a license denial is selectively sent from the license server over the virtual network connection responsive to the first license authorization request based on the number of active sessions.

20 Claims, 5 Drawing Sheets

CLOUD BASED VIRTUAL COMPUTING SYSTEM WITH LICENSE SERVER

BACKGROUND

Field of the Disclosure

The present disclosure relates generally to computing systems, and more particularly, to a cloud based virtual computing system with a license server.

Description of the Related Art

Computing networks are employed to connect multiple users to shared resources. However, conventional network approaches typically require an individual computer system for each user to execute the desired computing applications. In educational or workplace settings it is common for a bank of workstations to be provided to execute resource intensive applications, such as drawing programs, simulation programs, design automation programs, etc. Due to the high level of processing requirements, the workstations may need to be equipped with advanced processors, increased memory, specialized graphics hardware, etc. These processing demands limit the use of the programs outside the educational or workplace networks, as the computing devices used outside these networks (e.g., notebook computers or less powerful desktops) cannot effectively execute the advanced applications. In an educational setting, this arrangement makes it difficult to implement remote learning opportunities, as the remote students do not have access to the advanced workstations.

In some instances, an entity may maintain a limited number of licenses for a particular software application. A license server on the network may monitor the number of copies of the application in use at any particular moment in time and limit the number of active users according to the number of licenses owned. Hence, not all of the workstations in a facility may be able execute the licensed application, even if they have sufficient computing resources. In an educational setting, this restriction limits class sizes. The limitation also limits remote learning opportunities since the license server only facilitates license management for the workstations on the same network,

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

DETAILED DESCRIPTION

FIGS. 1-5 illustrate a cloud based virtual computing system with flexible local drive mapping, remote licensing monitoring, and collaborative remote workstation sharing. In the illustrated examples, virtual workstations may be implemented using a cloud based virtualization system, where users can access advanced applications on virtual machines in the cloud using a remote terminal application. The user may interact with advanced application as if a local advanced workstation were being used, but the advanced processing requirements for the application may be handled by the virtualization system. A virtual network service is employed to allow traffic to transparently traverse multiple networks and firewalls and to provide flexibility in local drive mapping. The virtual network arrangement may also be used to conduct license server operations to allow a license server to monitor the number of active instances of the advanced application being concurrently used, even though the license server is not on the same physical network. The arrangement also allows the creation of a collaboration session to allow multiple individuals (e.g., work team, student and instructor) to access the same virtual workstation.

Figure 1:
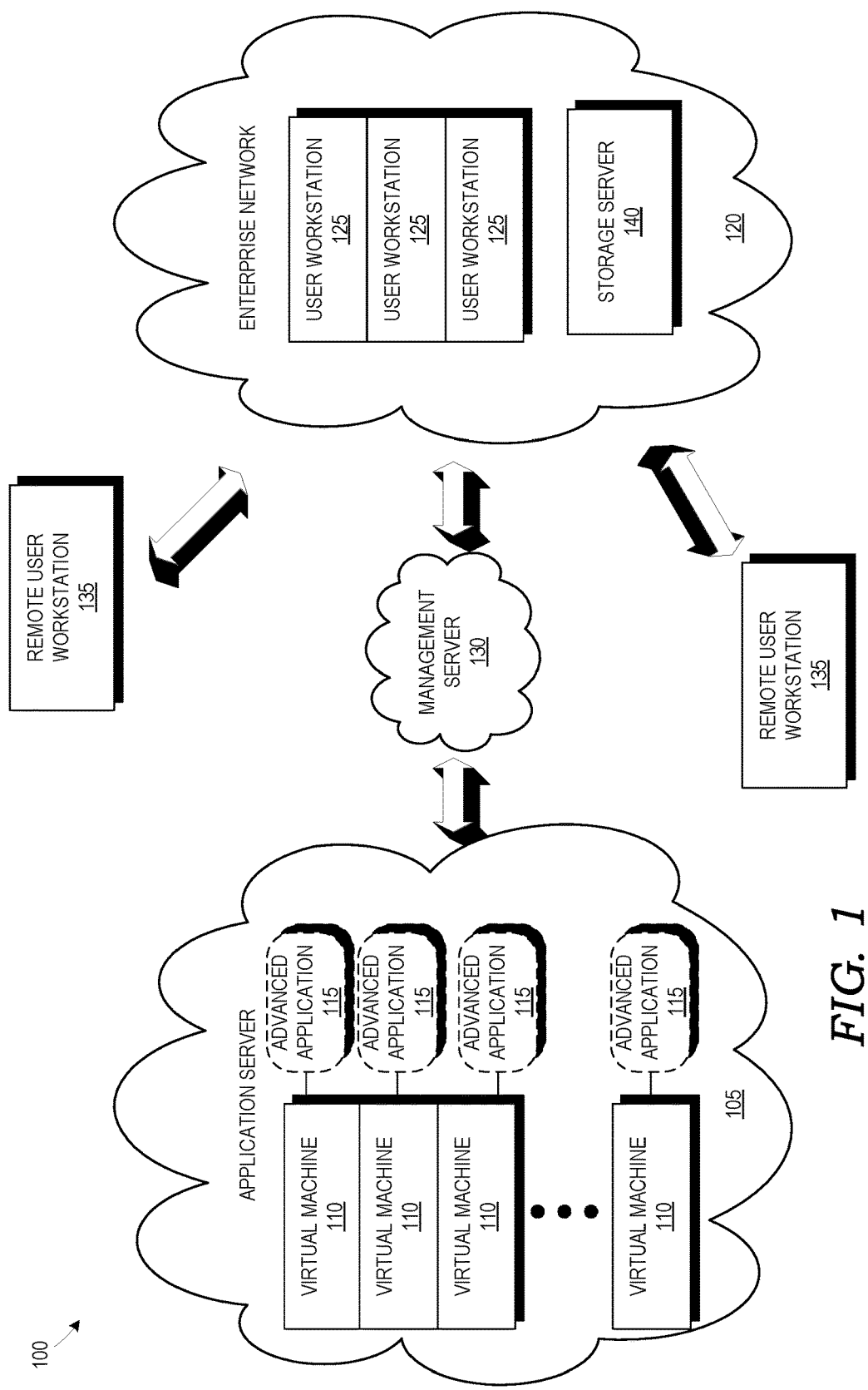
FIG. 1 is a simplified block diagram of a cloud based virtual computing system in accordance with some embodiments.

FIG. 1 is a simplified block diagram of a cloud based virtual computing system 100 in accordance with some embodiments. The system 100 includes an application server 105 operable to support the virtualization of a plurality of virtual machines 110. As known to those of ordinary skill in the art, machine virtualization involves dividing the computing resources of a physical processing unit or units into multiple virtual machines 110, each with its own operating system, software applications, virtual processor, memory, peripheral devices, etc. The virtualization resource allocates physical computing resources from a pool of computing systems, such as severs, to meet the processing demands of the individual virtual machines 110. Commercial application servers 105 that enable the use of virtual machines are AZURE® by MICROSOFT® and Amazon Web Services (AWS) by AMAZON®.

In the illustrated embodiment, the virtual machines 110 are employed to execute an advanced application 115. The advanced application 115 is intended to represent a particular software application that has relatively high processing requirement, such that it would typically requires the use of a relatively high powered computing system for its execution. For example, one such application is MATLAB®. However, the application of the subject matter disclosed herein is not limited to a particular software application.

The system 100 also includes an enterprise network 120 including a plurality of user workstations 125. In the illustrated embodiment, the user workstations 125 act as terminals for interacting with the virtual machines 110 to allow operation of the advanced applications 115. The use of the virtual machines 110 reduces the constraints on the processing power required for the user workstations 125.

A management server 130 interfaces between the user workstations 125 and the virtual machines 110. Communications may take place through the Internet using a remote terminal protocol, such as a remote desktop protocol (RDP). In some embodiments, the enterprise network 120 may support remote user workstations 135 that connect to the enterprise network 120 via secure protocols, such as virtual private network (VPN) connections, and subsequently connect through the enterprise network 120 and the management server 130 to one of the virtual machines 110. In this manner, users may be centrally located at a facility within the enterprise network 120 or they may be dispersed geographically. Such an arrangement supports distance learning for an educational institution or telecommuting for a business.

The enterprise network 120 may also include a storage server 140 for storing user data, such as data files, or report files associated with the advanced application 115. In some embodiments, the workstations 125, 135 may have local storage (e.g., drives) for storing the data in conjunction with or in lieu of the storage server 140. The term local storage, as used herein is intended to imply local to the enterprise network 120 or the terminals 125, 135, as compared to any remote storage provided by the application server 105.

The system 100 allows allow each user to have a separate virtual machine 110 that can be accessed using private credentials (username and password). In the course of operating the user generates various types of code and data (e.g., code related to the process the user wants to run and the output from running such code on various inputs). To provide enhanced privacy for the code and data, the system 100 is configured to provide a virtual tunnel between the enterprise network 120 and the application server 105 and the user's virtual machine 110, as described below.

Figure 2:
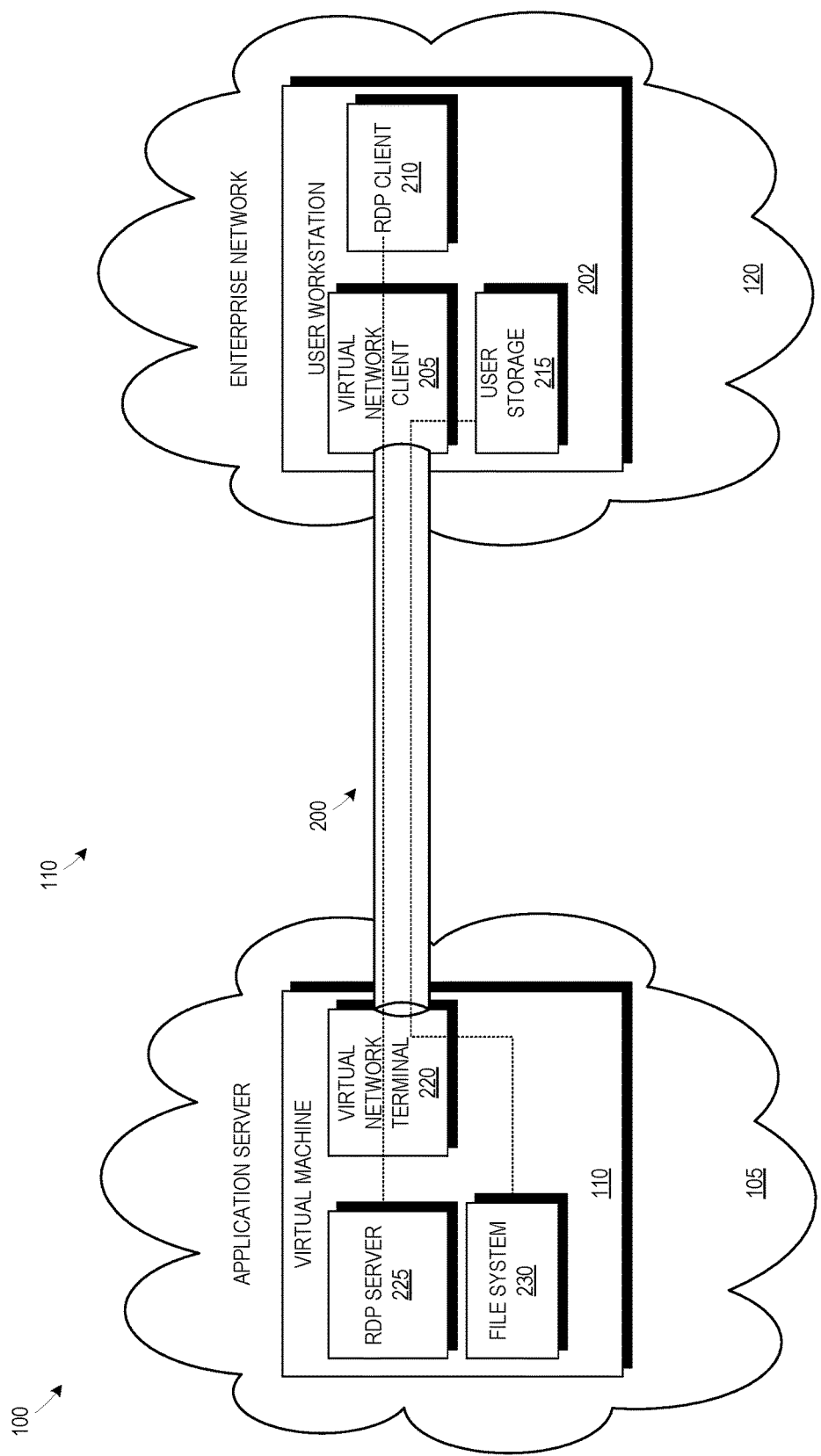
FIG. 2 is a simplified block diagram illustrating an arrangement for providing local drive mapping flexibility in accordance with some embodiments.

FIG. 2 is a simplified block diagram illustrating a virtual network tunnel 200 in accordance with some embodiments. A user workstation 202 (e.g., the user workstation 125 or the remote user workstation 135 in FIG. 1) implements a virtual network client 205, an RDP client 210, and user storage 215. The user storage 215 may be local to the user workstation 202 or local to the enterprise network 120. The virtual machine 110 implements a virtual network terminal 220, a RDP server 225, and file system 230.

Within the context of FIG. 1, the virtual network client 205 and the virtual network terminal 220 may be instantiated by the management server 130. The virtual network client 205 and the virtual network terminal 220 handle communication between the RDP client 210 and the RDP server 225. The virtual network client 205 and the virtual network terminal 220 allow the communication to occur across multiple domains, sub-domains, firewalls, etc. In many instances, networks may block certain types of traffic for security reasons, including but not limited to the common port allocated for RDP communication. The virtual network client 205 and the virtual network terminal 220 employ an HTTP protocol that is not impacted by various firewall restrictions. Since the traffic between the client terminal 205 and the virtual network terminal 220 appears as regular web traffic, it is not filtered. The virtual network client 205 and the virtual network terminal 220 encrypt and encapsulate the RDP traffic into data blocks (e.g., HTTP packets) that employ common HTTP message formats. In some embodiments, the virtual network client 205 and the virtual network terminal 220 may exchange periodic messages to verify that both sides of the virtual network tunnel 200 remain operable. This exchange allows the virtual network terminal 220 to send asynchronous traffic to the virtual network client 205, which might otherwise be blocked based on conventional network traffic rules.

In one embodiment, the virtual network terminal 220 and the virtual network client 205 maintain a TCP connection. When a remote desktop message (e.g., command) is generated by the RDP client 210, the virtual network client 205 receives the remote desktop message and converts it to a transport message using a different transport protocol. For example, the RDP message may be encoded using an ASCII coding (e.g., "AxrEbG543c2"). The length of the message may vary depending on the information being sent by the RDP client 210. Then, the virtual network client 205 sends a transport message in the format of an HTTP GET request to the virtual network terminal 220 (e.g., GET XXXX.net/encoded-packet/vY.Y/AxrEbG543c2), where XXXX.net is the address of the virtual network terminal 220, and Y.Y specifies the protocol version. In response, the virtual network terminal 220 receives the transport message, extracts and decodes the remote desktop message and forwards the extracted RDP message to the RDP server 225. The RDP server 225 may send a reply, which is intercepted by the virtual network terminal 220 and converted into another HTTP message (i.e., transport message), such as:

```
HTTP/1.1 200 OK
Date: Fri, 31 Dec 2016 23:59:59 GMT
Content-Type: image/gif
Content-Length: 1354
<DATA>
```

DATA refers to the RDP message from the RDP server 225 that was encoded. This arrangement provides that the exchanged data in the format of transport messages is treated like other HTTP traffic in the Internet and passes through the enterprise network 120 and its firewalls. In some embodiments, the transport message may encrypt the underlying RDP message.

Although the virtual network terminal 220 is illustrated as operating on the same virtual machine 110 as the RDP server 225, in some embodiments, it may be executed on a different virtual machine. A single virtual network terminal 220 may facilitate communication with multiple virtual machines 110 and the users at the associated virtual network clients 205.

The virtual network client 205 also allows the user workstation to virtually map the user storage 215 to the application server 105 so that the user storage 215 appears to the virtual machine 110 and the advanced application 115 to be a network-mounted file system. Thus, when the user saves any files, be it code or data, onto the network-mounted file system, these files are actually saved in the user storage 215. The user storage 215 may or may not be resident on the user workstation 202. None of the data or code that such a system would generate as part of the user's interaction with the cloud-based server would therefore, be in the file system 230 provided by the application server 105. This approach provides transparency to the advanced application 115. As a consequence, a user's private data can be saved in the user storage 215, thereby enhancing privacy.

In one example, a network file system (NFS) approach may be employed. NFS employs TCP based communication to allow a NFS client device to request content that is stored in a NFS server. Remotely stored content is "mounted" so that clients can access and use the content. When an application mounts a remotely located file system, or makes a request for a file (or parts of a file), it uses a RPC (Remote Procedure Call) to accomplish these goals. The NFS communication may run on TCP or UDP transports, depending on the version of NFS.

In the context of FIG. 2, the file system 230 on the virtual machine 110 represents an NFS client, and the virtual network client 205 acts as an NFS server that mounts the user storage 215. Regardless of the actual physical location of the user storage 215, it appears to be a mounted storage location to the virtual machine 110 and the file system 230. The RPC communication will be exchanged through the virtual network client 205 and the virtual network terminal 220. The user may specify the location of the user storage 215 (e.g., attached to user workstation 202, network storage location, etc.). In another embodiment, the virtual network client 205 may implement packet forwarding, where the traffic is simply forwarded packet by packet to the user storage 215. In this manner, the RDP server 225 sees the user storage 215 as a local drive of the user workstation 202 and maps it accordingly. In actuality, the physical location of the user storage 215 may at another location on the network 120 or on an entirely different computer.

Figure 3:
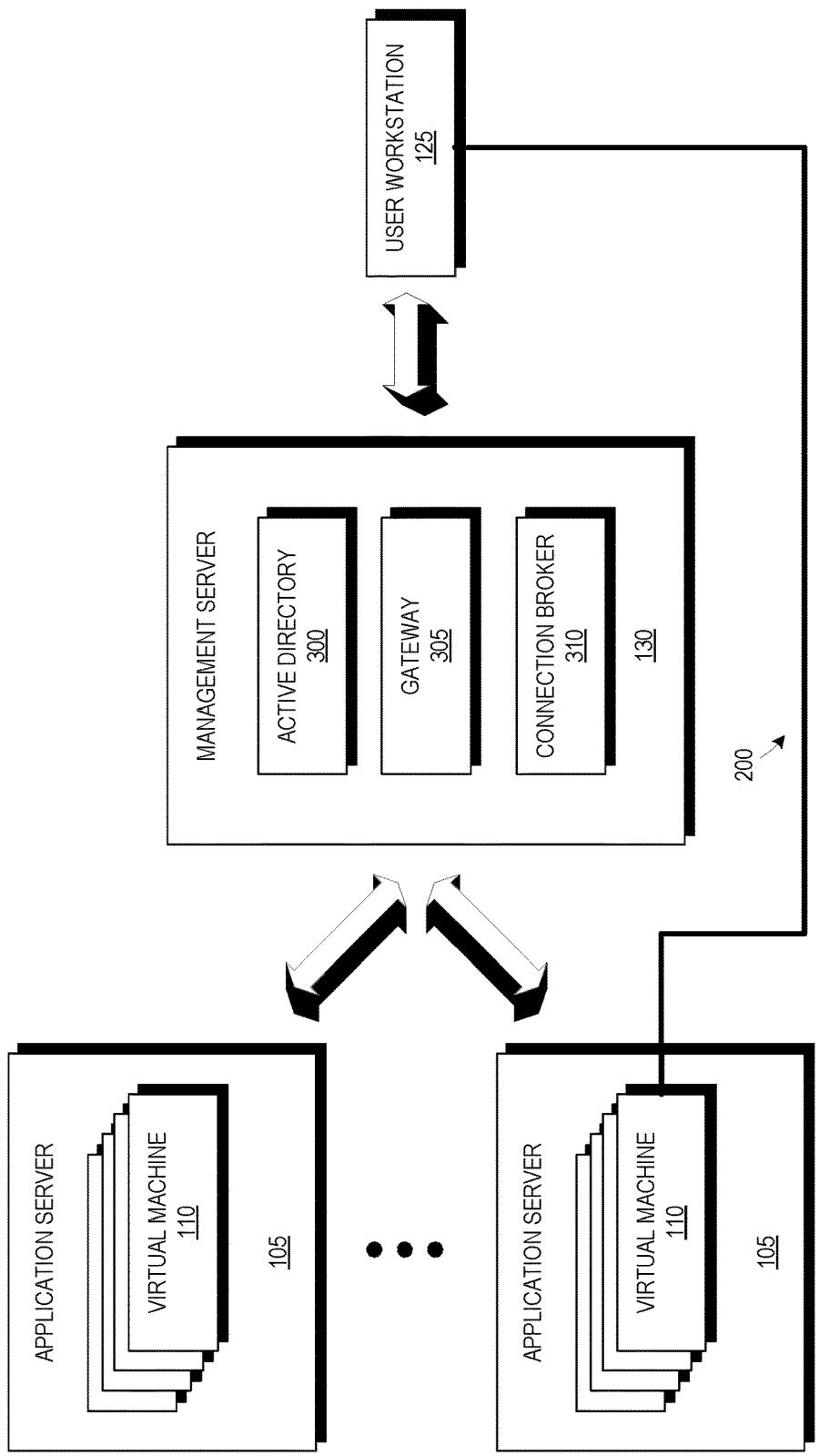
FIG. 3 is a simplified block diagram illustrating how the management server brokers connections between the user workstation and an application server to instantiate a virtual machine in accordance with some embodiments.

FIG. 3 is a simplified block diagram illustrating how the management server 130 brokers connections between the user workstation 125 and an application server 105 to instantiate a virtual machine 110. The management server 130 implements an active directory service 300, a gateway 305, and a connection broker 310.

A user of the workstation 125 interfaces with the management server 300 (e.g., using a web page interface) to issue a connection request and enters login credentials. The active directory 300 validates the user credentials. If the credentials do not match, the active directory 300 replies back to the user with an invalid credentials message. If the credentials match, the active directory 300 forwards the connection request to the gateway 305. The gateway 305 enables the user workstation 125 to establish a connection with a virtual machine 110 executing on an application server 105 using the Remote Desktop Protocol (RDP) over HTTPS to establish a secure, encrypted connection between the user workstation 125 and that virtual machine 110.

The gateway 305 instructs the connection broker 310 to identify the most appropriate application server 105 in which the user's virtual machine 110 should be loaded. In general, the management server 130 may benchmark how many simultaneous virtual machines 110 maybe operational in a single application server 105 based on various parameters, such as application workload, network bandwidth, memory usage, etc.). If there is an existing application server 105 in which the user's virtual machine 110 can be loaded and operationalized, then that particular application server 105 will be used. If not, a new application server 105 is requested and launched, and the virtual machine 110 is installed on a new application server 105. The virtual machines 110 on different application servers 105 may appear as if they are on the same local network.

Once the appropriate application server 105 is identified, the virtual machine 110 assigned to the user is launched and the RDP session between the user workstation 125 and the virtual machine 110 is established using the virtual network tunnel 200. As described in FIG. 2, depending on user configurations, the virtual machine 110 may map storage on the user workstation 125 to appear as a storage device in the virtual machine 110. This functionality allows the user to directly store and save content in their personal devices and not in the cloud, if so desired. At this point the user can interact with the virtual machine 110 from the user workstation 125 to execute the advanced application 115 (see FIG. 1). If there is any failure of the RDP session between the user workstation 125 and the virtual machine 110, the state of the virtual machine 110 is preserved, and the user may log back in and continue using the virtual machine 110 at the previously preserved state.

In many settings, the software vendor associated with the advanced application 115 may require that a license server be deployed for managing authorized use of the software. For instance, operator of the enterprise network 120 or the user may have purchased K licenses for the advanced application 115, which limits up to K simultaneous users to operate the advanced application 115 in parallel on different user workstations 125. Typically it is expected that the license server will operate within the same local network in which the software itself is running. For the example in FIG. 1, with the advanced application 115 running in the application server 105, it would imply that the license server would need to also be placed in application server 105 to provide that the license server and application server 105 are part of the same network. Typically, another additional constraint on the license server is that the license server needs to always run on a fixed physical machine, which maybe uniquely identified by some hardware within the server, such as the MAC address of its primary Ethernet port, or a hashed output of a combination of multiple such identifiers. The actual identification mechanism used by the software vendor may be proprietary and may vary from software vendor to vendor. A challenge in a virtual computing environment is that if the license server were to run on the application server, it would run as a virtual machine 110 on a physical server, and the actual physical server itself might change from time to time. Also, the user sessions may be spread across multiple application servers 105. As a result, the hardware might not be constant across different runs of the license server.

Figure 4:
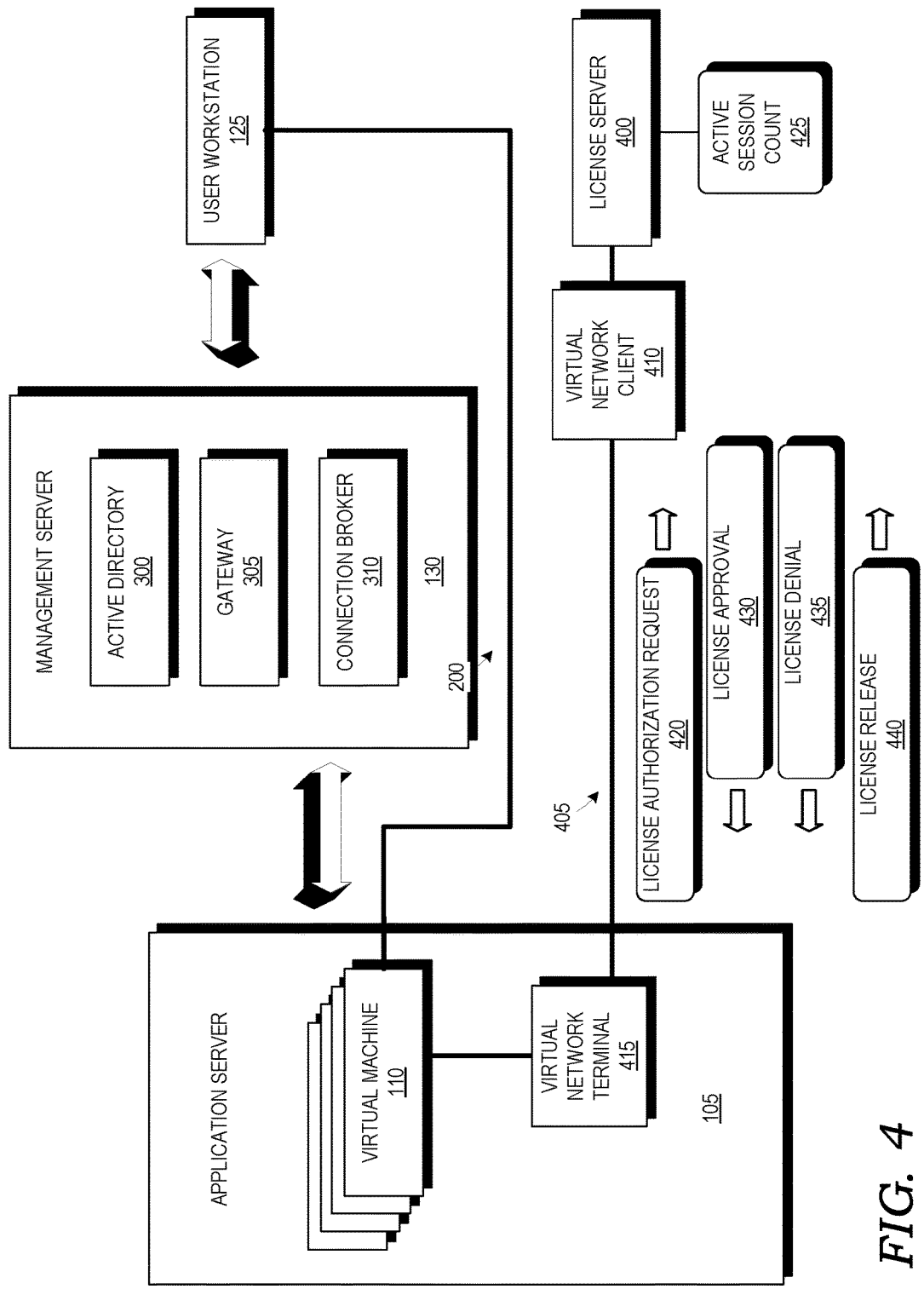
FIG. 4 is a simplified block diagram illustrating how the management server establishes a tunnel with a license server in accordance with some embodiments.

FIG. 4 is a simplified block diagram illustrating how the management server 130 establishes a tunnel with a license server 400 in accordance with some embodiments. The license server 400 executes on physical hardware that is separate from the application servers 105. The license server 400 may be provided on the enterprise network 120, the management server 130, or elsewhere on the Internet. The license server 400 authenticates itself with the management server 130, and a virtual network tunnel 405 is established. The virtual network tunnel 405 may be implemented using a virtual network client 410 and a virtual network terminal 415 that operates as described above in reference to FIG. 2. In some embodiments, the virtual network client 410 and the virtual network terminal 415 implement a virtual private network (VPN) connection, allowing the license server 400 to appear to be located on the same local network as the virtual machines. Since the license server 400 is executed on dedicated physical hardware, the specific validation scheme employed by the software vendors is not affected by virtualization. The virtual network tunnel 405 makes it appear as if the virtual machines 110 and the license server 400 are on the same network.

When the user launches an application in the virtual machine 110, that application communicates with the license server 400. The license server information is configured into the advanced application 115 (see FIG. 1). The virtual machine 110 sends a license authorization request 420 to the license server 400. The license server 400 maintains a count of active sessions 425. If the number of active sessions is less than the maximum, the license server 400 sends a license approval 440 to the virtual machine 110 for the particular instance of the advanced application 115. If the maximum number of active sessions for the given application 115 is reached, then a new instance of the application 115 will not be able to execute and the license server 400 instead issues a license denial 435 and user gets an appropriate message about the issue.

When a user terminates the advanced application 115, the virtual machine 110 sends a license release 440 to the license server 400. The license server 400 returns the license to the pool of available licenses and updates the active session count 425. Hence, the total number of licenses available may be less than the total number of authorized users. Only active sessions are counted against the number of licenses. If a license is surrendered by a user terminating the advanced application 115, a different user may instantiate a different virtual machine 110 and use that license. This arrangement operates under the assumption that not all users will likely have active sessions at a given time.

Figure 5:
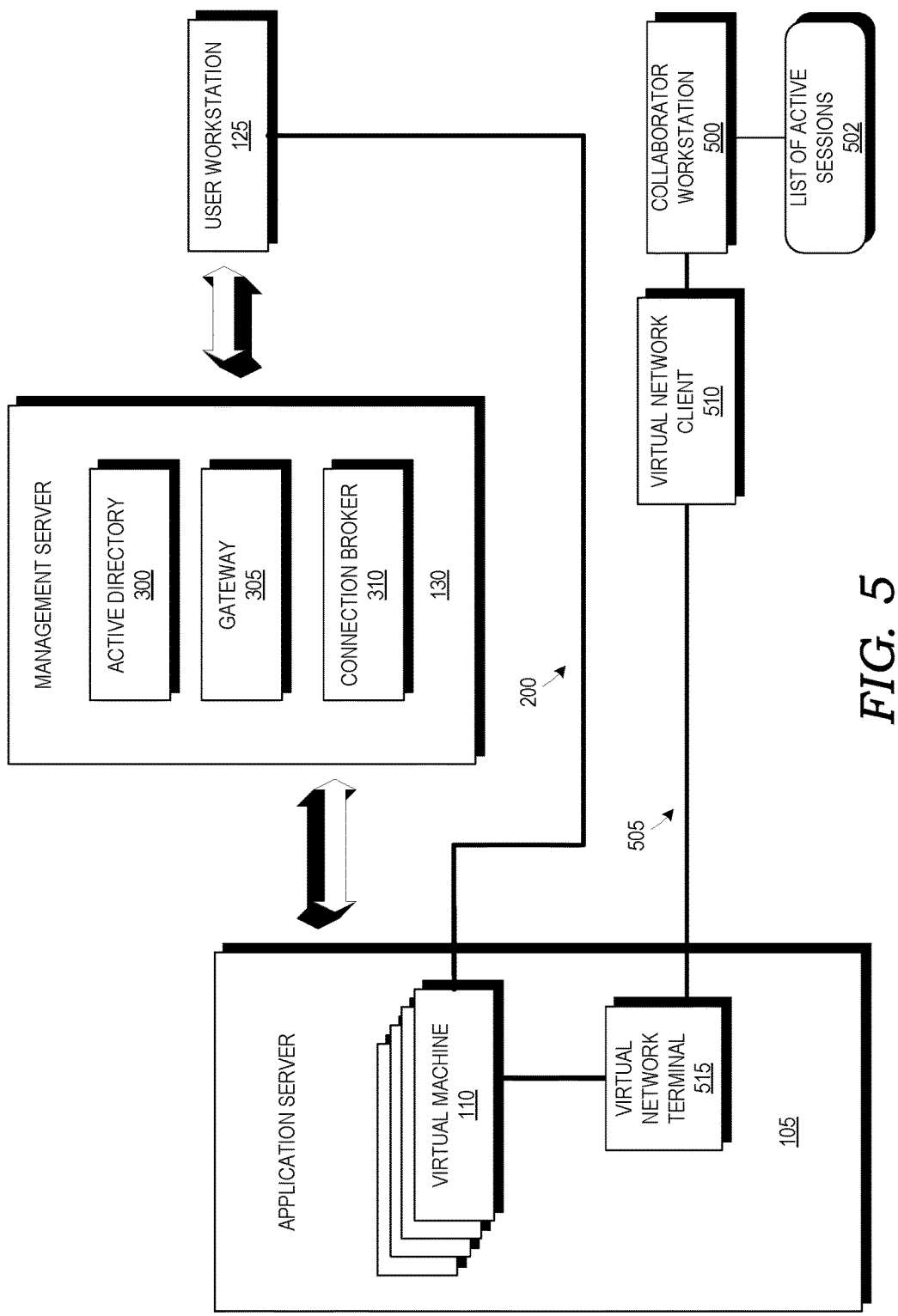
FIG. 5 is a simplified block diagram illustrating how the management server establishes multiple tunnels to a virtual machine to allow for collaboration in accordance with some embodiments.

FIG. 5 is a simplified block diagram illustrating how the management server 130 establishes multiple tunnels to a virtual machine 110 to allow for collaboration in accordance with some embodiments. For example, an instructor may monitor or assist a student, or colleagues may work together using the same virtual machine 110. This arrangement allows for the collaborators to be located in the same location (e.g., a computer lab) or to de dispersed geographically.

The user of a collaborator workstation 500 authenticates with the management server 130. Based on the user profile, a hierarchy of access levels may be provided. The user may communicate to the management server 130 that a collaboration connection is desired as opposed to a new virtual machine 110 instantiation. The management server 130 may provide the user a list 502 of active sessions that allow collaboration based on the user profile. The list may be filtered based on the user profile. For example, a user with an instructor profile would be provided with a list of student sessions. A student may be provided with a list of other students to allow collaboration on a joint project. An instructor may select a particular active session, and the management server 130 establishes a virtual network tunnel 505 with the selected virtual machine 110. The virtual network tunnel 505 may be implemented using a virtual network client 510 and a virtual network terminal 515 that operates as described above in reference to FIG. 2.

In some embodiments, both sessions may have access to the virtual machine 110 so that the student can follow along as the instructor observes the student's work and suggests improvements. In some embodiments, the instructor may have special privileges that allow the second session over the virtual network tunnel 505 to block the first session over the first virtual network tunnel 200 to temporarily prevent a student from accessing the virtual machine 110, e.g., to ensure that the student cannot make any changes to code or data during the grading process. The instructor may select the block option when selecting particular session to join. In the case of two students collaborating using a common virtual machine 110, the block option would not be available when the selected session was joined, again based on the user profile.

The collaboration features may be implemented on top of the RDP service. An instructor account is configured with information of all student accounts and their passwords. So when the instructor logs in, a prompt is provided to allow logging in as a student or an instructor. An instructor may pick any student from the class and log in as that individual. If the student is also logged in at the same time, both can access the virtual machine 110 and the desktop and the student can walk the instructor through his or her work. Further, all student folders may be mapped to the instructor's account with read-only privileges to allow the instructor can look at any and all files that the student might have created. In this manner, the instructor can visually inspect the issues being faced by the student. The instructor will essentially have access to the same virtual machine 110, as well as to all files that the students might have either saved or be working on in the virtual machine 110. The instructor can control the activities of the student's virtual machine 110, e.g., using a local keyboard and mouse, etc., and the student would also be able to see what changes the instructor is making to solve the problems being faced.

The concept, of course, generalizes to multiple students and the instructor can remote desktop to any and every student's virtual machine 110 and account and inspect each of their work, code, and desktop for both teaching and grading. The concept also generalizes to collaboration in a professional environment, where different access levels may be provided based on user profiles according to the position of the individual within the organization. For example, a supervisor or administrator profile may have privileges similar to those described above for the instructor.

A method includes establishing a remote desktop connection between a first computing device and a first virtual machine executed by a second computing device. The remote desktop connection operates using remote desktop messages formatted according to a first protocol. A virtual network tunnel is established between the second computing device and the first virtual machine for communicating the remote desktop messages. At a first end of the virtual network tunnel, remote desktop messages formatted using the first protocol are converted to generate transport messages using a transport protocol different than the first protocol and the transport messages are communicated over the virtual network tunnel. At a second end of the virtual network tunnel, the transport messages are received and the remote desktop messages are extracted from the transport messages.

A method includes receiving remote desktop messages from a remote desktop server executing on a first virtual machine, converting remote desktop messages to transport messages, and communicating the transport messages to a second computing device.

A system includes a first computing device to execute a virtual machine. The virtual machine is to execute a virtual network server. A second computing device is to execute a virtual network client. A virtual network tunnel is operated by the virtual network server and the virtual network client. A first end of the virtual network tunnel is to convert remote desktop messages formatted using a first protocol to generate transport messages using a transport protocol different than the first protocol and communicate the transport messages over the virtual network tunnel. A second end of the virtual network tunnel is to receive the transport messages and extract the remote desktop messages from the transport messages.

A method includes instantiating a plurality of virtual machines on at least one application server. The plurality of virtual machines define a local network. A virtual network connection is established between the local network and a license server. The license server is executed by a first computing device different than the application server. A first license authorization request is sent from a first virtual machine of the plurality of virtual machines to the license server over the virtual network connection to authorize the execution of a first application on the first virtual machine. A license approval is received from the license server over the virtual network connection responsive to the first license authorization request.

A method includes establishing a virtual network connection between a local network including a plurality of virtual machines executing on at least one application server and a license server. The license server is executed by a first computing device different than the application server. A first license authorization request is received from a first virtual machine of the plurality of virtual machines at the license server over the virtual network connection. A number of active sessions of the first application executing on the plurality of virtual machines is determined. A license approval or a license denial is selectively sent from the license server over the virtual network connection responsive to the first license authorization request based on the number of active sessions.

A system includes a license server executing on a first computing device to establish a virtual network connection with a local network including a plurality of virtual machines executing on at least one application server different than the first computing device. The license server is to receive a first license authorization request from a first virtual machine of the plurality of virtual machines over the virtual network connection, determine a number of active sessions of the first application executing on the plurality of virtual machines, and selectively send a license approval or a license denial from the license server over the virtual network connection responsive to the first license authorization request based on the number of active sessions.

A method includes instantiating a first virtual machine on a first computing device, establishing a first remote desktop connection between a second computing device and the first virtual machine, establishing a second remote desktop connection between a third computing device and the first virtual machine, and allowing access to the first virtual machine using the first and second remote desktop connections.

A system includes a first computing device to execute a first virtual machine. A second computing device is to establish a first remote desktop connection with the first virtual machine. A third computing device is to establish a second remote desktop connection with the first virtual machine. The first and second remote desktop connections have concurrent access to the first virtual machine.

In some embodiments, certain aspects of the techniques described herein may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM), or other non-volatile memory devices, and the like. The executable instructions stored on the non-transitory computer readable storage medium may be in source code, assembly language code, object code, or other instruction format that is interpreted or otherwise executable by one or more processors.

A non-transitory computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   instantiating a plurality of virtual machines on at least one application server, the plurality of virtual machines defining a local network;
   establishing a virtual network connection between the local network and a license server, wherein the license server is executed by a first computing device different than the application server;
   sending a first license authorization request from a first virtual machine of the plurality of virtual machines to the license server over the virtual network connection to authorize the execution of a first application on the first virtual machine;
   receiving a license approval from the license server over the virtual network connection responsive to the first license authorization request;
   sending a second license authorization request from a second virtual machine of the plurality of virtual machines to the license server over the virtual network connection;
   receiving a second license approval in the second virtual machine from the license server over the virtual network connection responsive to a number of active sessions of the first application on the local network being less a maximum number of authorized sessions; and receiving a first license denial in the second virtual machine from the license server over the virtual network connection responsive to the number of active sessions of the first application on the local network being equal to the maximum number of authorized sessions.

2. The method of claim 1, wherein the virtual network connection comprises a virtual private network (VPN) connection.

3. The method of claim 1, further comprising:
sending a license release notification to the license server responsive to terminating the first application on the first virtual machine.

4. The method of claim 1, further comprising:
establishing a remote desktop connection between a first computing device and the first virtual machine, the remote desktop connection operating using remote desktop messages formatted according to a first protocol;
establishing a virtual network tunnel between the first computing device and the first virtual machine for communicating the remote desktop messages;
at a first end of the virtual network tunnel, converting remote desktop messages formatted using the first protocol to generate transport messages using a transport protocol different than the first protocol, and communicating the transport messages over the virtual network tunnel; and
at a second end of the virtual network tunnel, receiving the transport messages and extracting the remote desktop messages from the transport messages.

5. The method of claim 4, wherein converting the remote desktop messages further comprises encrypting the remote desktop messages.

6. The method of claim 4, wherein the transport protocol comprises a hypertext transfer protocol (HTTP) and the first protocol comprises a remote desktop protocol (RDP).

7. The method of claim 4, further comprising:
configuring the first computing device as a file system host;
configuring the first virtual machine as a file system client; and
mapping a first storage device coupled to the first computing device as a second storage device in the first virtual machine.

8. The method of claim 7, further comprising communicating exchanges between the file system host and the file system client over the virtual network tunnel.

9. The method of claim 4, further comprising:
executing a remote desktop terminal on the first virtual machine and a remote desktop client on the first computing device to implement the remote desktop connection;
executing a virtual network terminal on the first virtual machine interfacing with the remote desktop terminal; and
executing a virtual network client on the first computing device interfacing with the remote desktop client, wherein the virtual network terminal and the virtual network client implement the virtual network tunnel.

10. The method of claim 9, further comprising:
executing a remote desktop terminal on the first virtual machine and a remote desktop client on the first computing device to implement the remote desktop connection;
executing a virtual network terminal on a second virtual machine different than the first virtual machine to interface with the remote desktop terminal;
executing a virtual network client on the first computing device to interface with the remote desktop client to implement the virtual network tunnel, wherein the virtual network terminal and the virtual network client implement the virtual network tunnel.

11. A method, comprising:
establishing a virtual network connection between a local network including a plurality of virtual machines executing on at least one application server and a license server, wherein the license server is executed by a first computing device different than the application server;
establishing a remote desktop connection between a first computing device and a first virtual machine of the plurality of virtual machines, the remote desktop connection operating using remote desktop messages formatted according to a first protocol;
establishing a virtual network tunnel between the first computing device and the first virtual machine for communicating the remote desktop messages;
at a first end of the virtual network tunnel, converting remote desktop messages formatted using the first protocol to generate transport messages using a transport protocol different than the first protocol, and communicating the transport messages over the virtual network tunnel;
at the second end of the virtual network tunnel, receiving the transport messages and extracting the remote desktop messages from the transport messages;
receiving a first license authorization request from the first virtual machine of the plurality of virtual machines at the license server over the virtual network connection;
determining a number of active sessions of the first application executing on the plurality of virtual machines; and
selectively sending a license approval or a license denial from the license server over the virtual network connection responsive to the first license authorization request based on the number of active sessions.

12. The method of claim 11, wherein selectively sending the license approval or the license denial comprises:
sending the license approval responsive to a number of active sessions of the first application on the local network being less a maximum number of authorized sessions; and
sending the license denial responsive to the number of active sessions of the first application on the local network being equal to the maximum number of authorized sessions.

13. The method of claim 11, further comprising:
receiving a license release in the license server from the local network; and
updating the number of active sessions.

14. The method of claim 11, wherein the virtual network connection comprises a virtual private network (VPN) connection.

15. A system, comprising:
a license server executing on a first computing device to establish a virtual network connection with a local network including a plurality of virtual machines executing on at least one application server different than the first computing device, wherein the license server is to receive a first license authorization request from a first virtual machine of the plurality of virtual machines over the virtual network connection, determine a number of active sessions of the first application executing on the plurality of virtual machines, selectively send a license approval or a license denial from the license server over the virtual network connection responsive to the first license authorization request based on the number of active sessions, receive a second license authorization request from a second virtual machine of the plurality of virtual machines over the virtual network connection, send a second license approval to the second virtual machine over the virtual network connection responsive to a number of active sessions of the first application on the local network being less a maximum number of authorized sessions, and send a first license denial to the second virtual machine over the virtual network connection responsive to the number of active sessions of the first application on the local network being equal to the maximum number of authorized sessions.

16. The system of claim 15, wherein the license server is to send the license approval responsive to a number of active sessions of the first application on the local network being less a maximum number of authorized sessions, and sending the license denial responsive to the number of active sessions of the first application on the local network being equal to the maximum number of authorized sessions.

17. The method of claim 15, wherein the license server is to receive a license release from the local network and update the number of active sessions.

18. The system of claim 15, wherein the virtual network connection comprises a virtual private network (VPN) connection.

19. The system of claim 15, further comprising a management server to establish a remote desktop connection between a first computing device and the first virtual machine, the remote desktop connection operating using remote desktop messages formatted according to a first protocol, establishing a virtual network tunnel between the first computing device and the first virtual machine for communicating the remote desktop messages, wherein at a first end of the virtual network tunnel remote desktop messages formatted using the first protocol are converted to generate transport messages using a transport protocol different than the first protocol, and the transport messages are communicated over the virtual network tunnel, and at a second end of the virtual network tunnel, the transport messages are received and the remote desktop messages are extracted from the transport messages.

20. The method of claim 11, further comprising:
 receiving a second license authorization request from a second virtual machine of the plurality of virtual machines in the license server over the virtual network connection;
 sending a second license approval to the second virtual machine from the license server over the virtual network connection responsive to a number of active sessions of the first application on the local network being less a maximum number of authorized sessions; and
 sending a first license denial to the second virtual machine from the license server over the virtual network connection responsive to the number of active sessions of the first application on the local network being equal to the maximum number of authorized sessions.

\* \* \* \* \*